March 13, 1928.

E. R. FELLOWS 1,662,109

HIGH SPEED GEAR GENERATING MACHINE

Filed June 7, 1923

INVENTOR
Edwin R. Fellows
by Wright, Brown, Quinby & May
att'ys

March 13, 1928.

E. R. FELLOWS 1,662,109

HIGH SPEED GEAR GENERATING MACHINE

Filed June 7, 1923

INVENTOR
Edwin R. Fellows by Wright, Brown, Quinby & May
att'ys

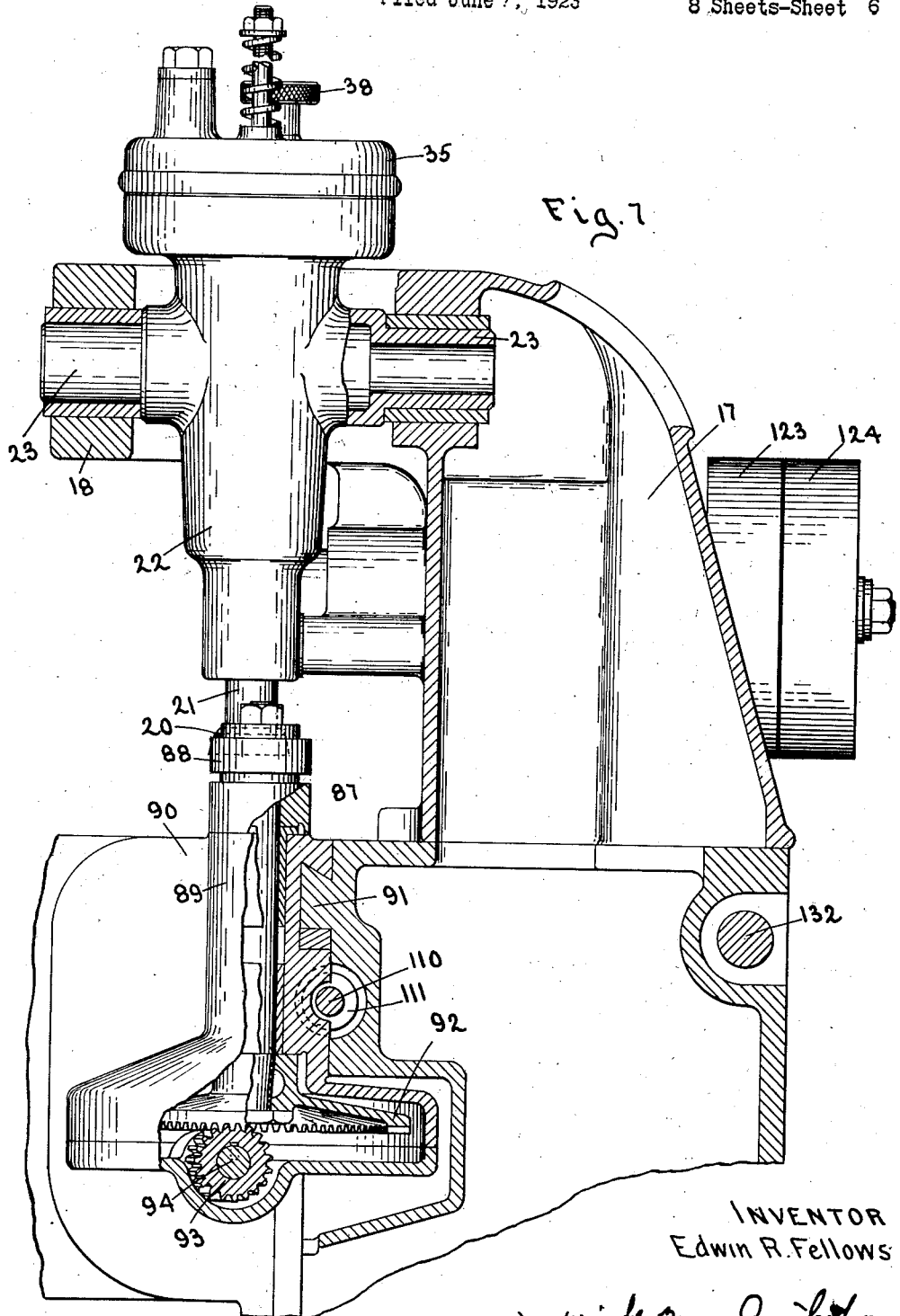

March 13, 1928.
E. R. FELLOWS
1,662,109
HIGH SPEED GEAR GENERATING MACHINE
Filed June 7, 1923    8 Sheets-Sheet 7
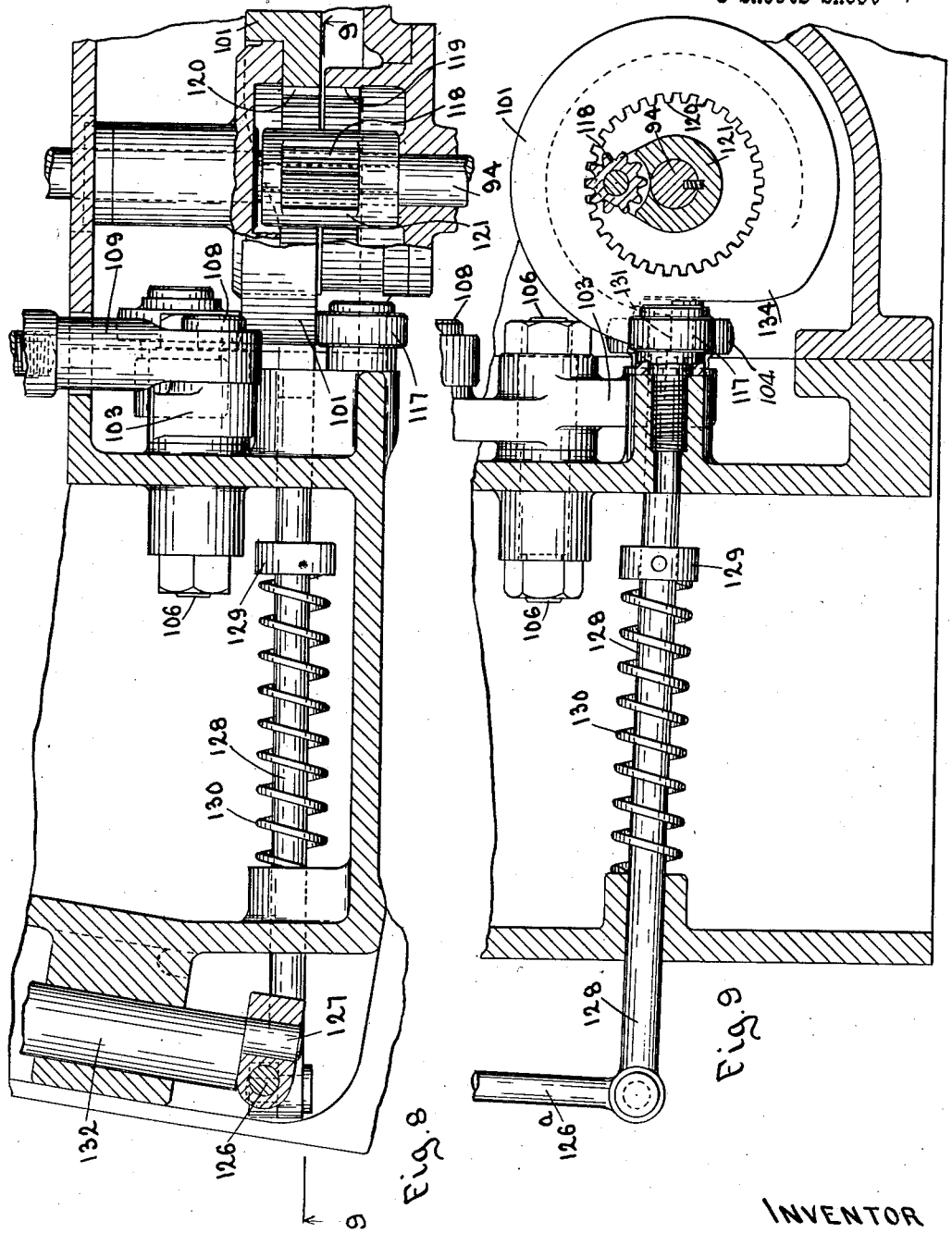
INVENTOR
Edwin R. Fellows March 13, 1928.  1,662,109
E. R. FELLOWS
HIGH SPEED GEAR GENERATING MACHINE
Filed June 7, 1923    8 Sheets-Sheet 8
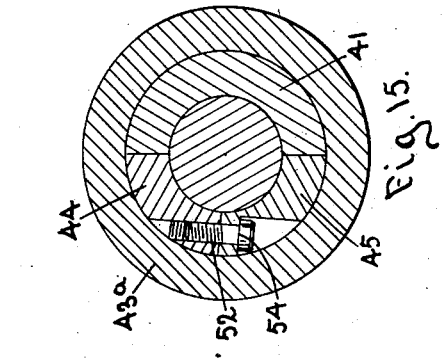
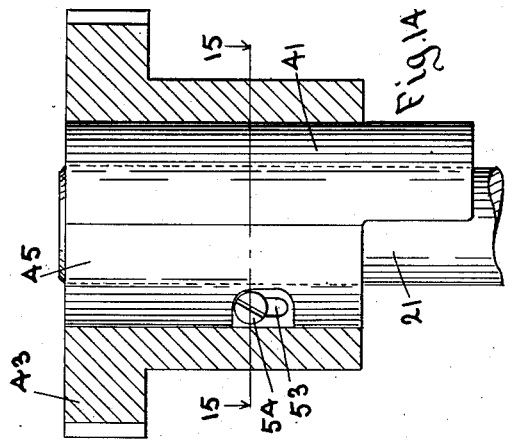
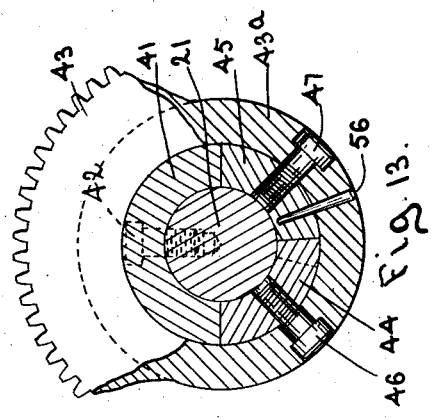
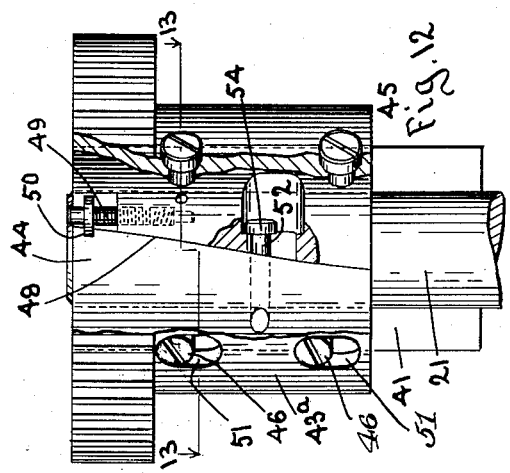
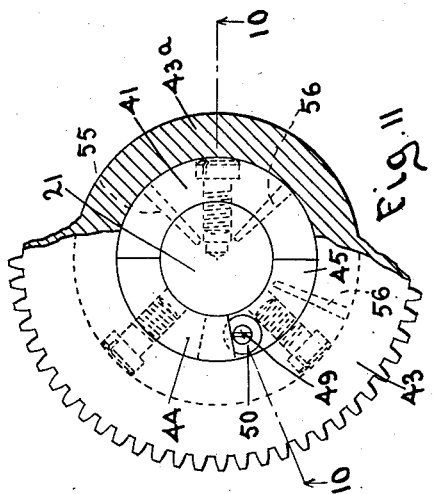
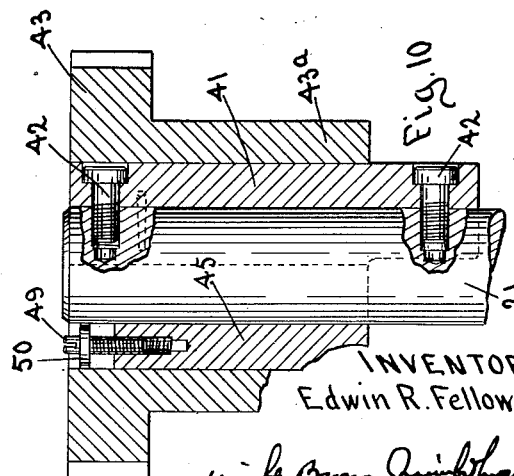
INVENTOR
Edwin R. Fellows Patented Mar. 13, 1928.

1,662,109

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

HIGH-SPEED-GEAR-GENERATING MACHINE.

Application filed June 7, 1923. Serial No. 643,884.

This invention relates to machines for generating and cutting gears of the spur type, by the action of a planing cutter which is, itself, shaped like a spur gear; and is more particularly concerned with machines of this class which are designed and adapted to operate at high speeds. In my prior Patents No. 1,478,472, dated December 25, 1923, and No. 1,463,806, dated August 7, 1923, I have disclosed gear generating or shaping machines which are capable of operating efficiently and with the desired accuracy at speeds several times greater than previously employed.

In producing the invention which I am now about to describe, my principal object has been to increase still further the speed of operation of such machines. I have accomplished this object and attained a speed of operation from seventy-five to one hundred percent greater than that which I have accomplished by the machines disclosed in the above identified patents at the same time without causing objectionable vibration as a consequence of such increased speed, by making the reciprocating parts lighter and introducing other improvements, by which the use of such lighter parts is made possible with the preservation of the high quality of accuracy which has been a characteristic of the machines produced according to my inventions, and has become an essential in the gearing art.

The other objects and accomplishments of the invention, and the characteristics in which they consist can best be explained by a detailed description of a concrete embodiment of the invention. Such a description with an explanation of the operation of the machine and the principles underlying the same, to which in particular my claims are directed, is given in the following specification in connection with the drawings associated therewith.

In the drawings referred to,—

Figure 4:
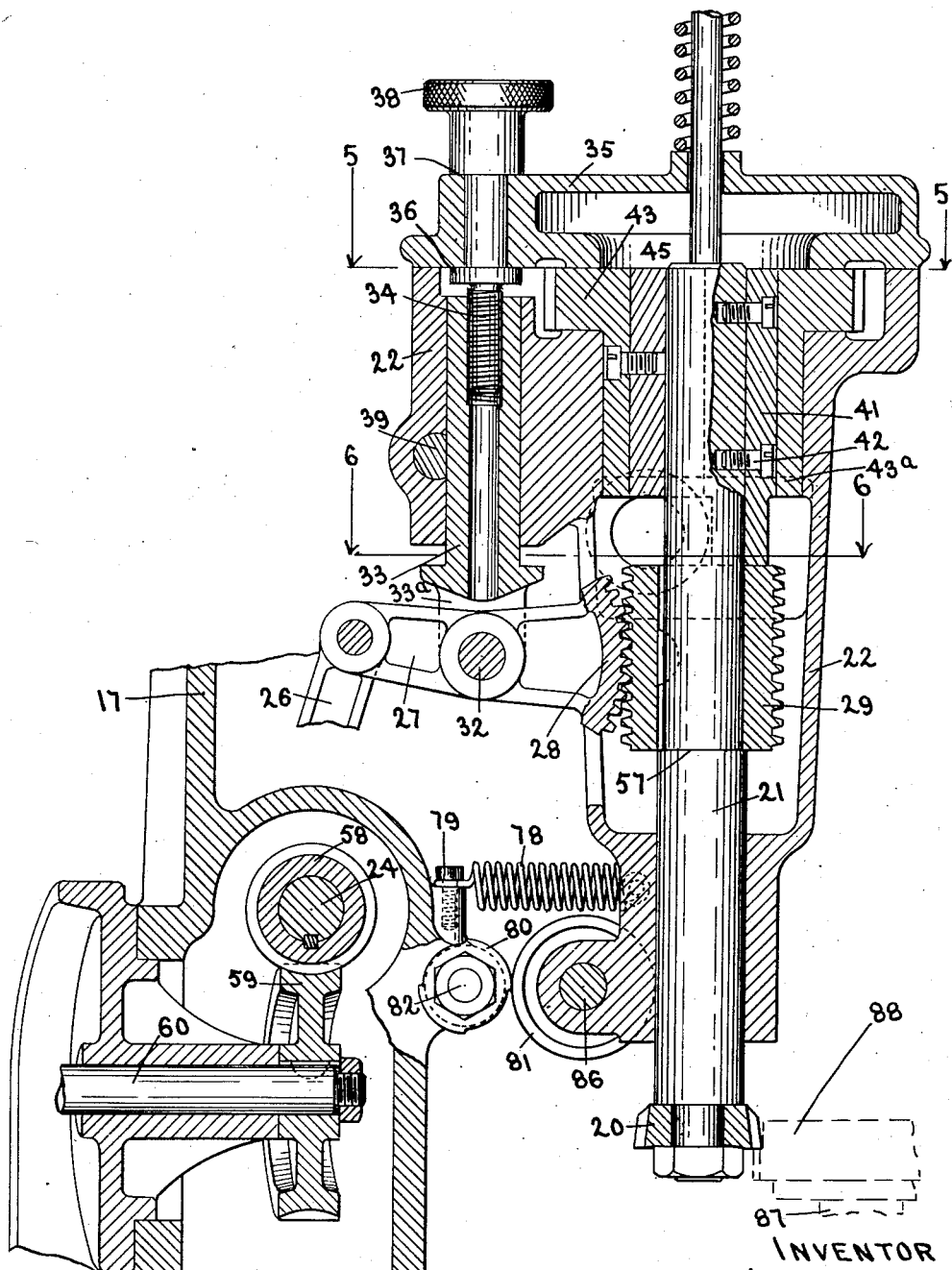
Figure 4 is a vertical section taken on line 4—4 of Figure 3, showing particularly the cutter spindle and head, the means for driving the spindle for cutting and generating, and the means for moving the head for backing off the cutter during its non-cutting strokes.
Figure 6:
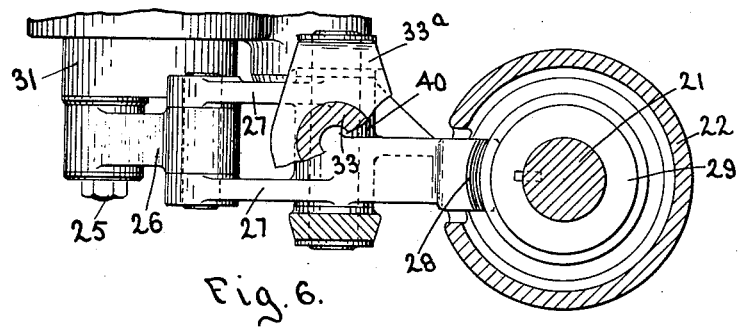
Figure 5:
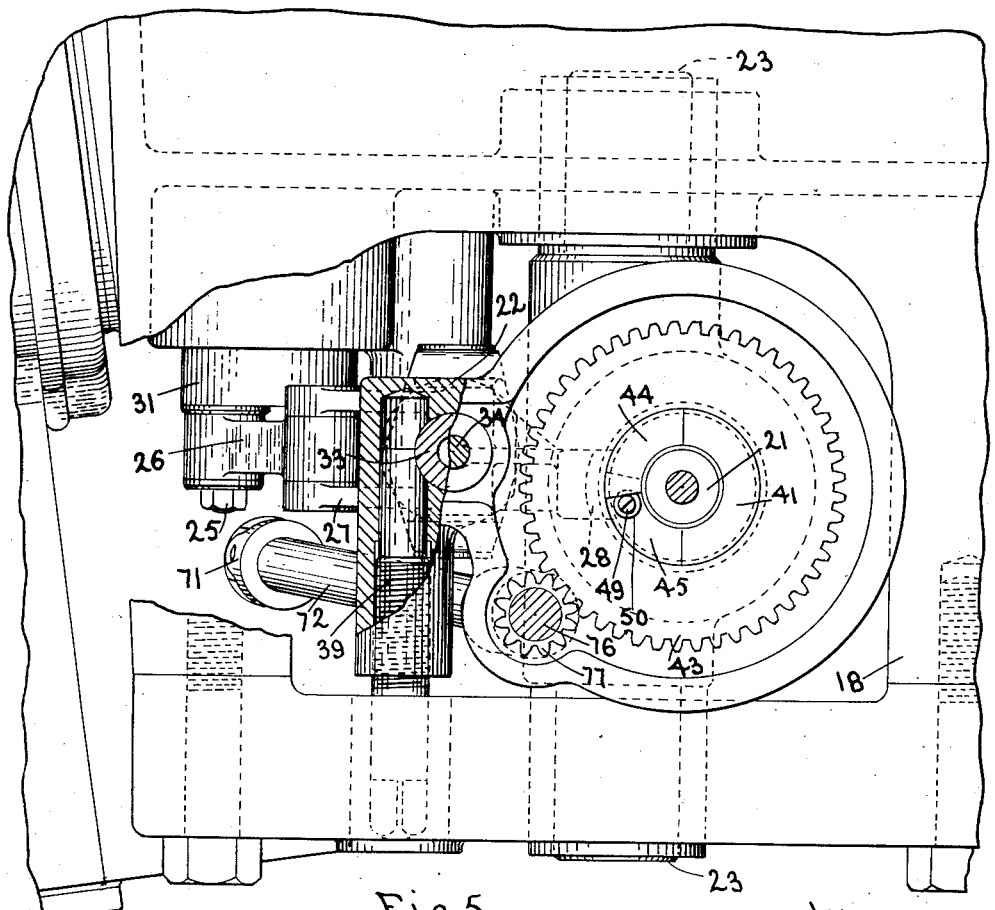

Figures 5 and 6 are horizontal sections taken on lines 5—5 and 6—6, respectively, of Figure 4.

Figure 1:
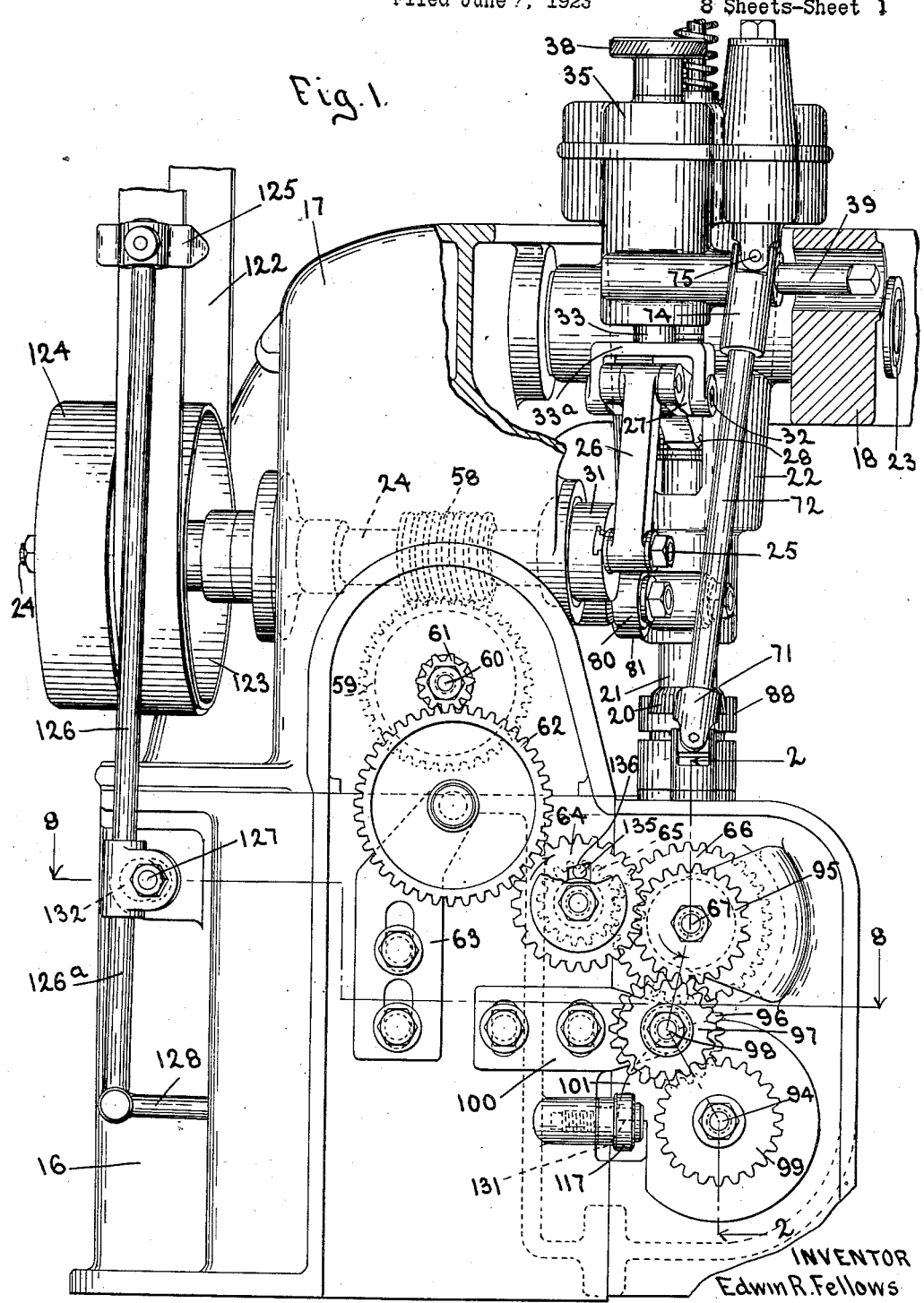
Figure 1 is a side elevation, with the upper part of the frame broken away to show the working parts, of a machine embodying what I now consider to be the best form of the invention.

Figure 7 is, in part, an elevation of the machine as seen from the right of Figure 1 and in part a sectional view of the base and supporting frame.

Figure 8 is a detail horizontal section taken on line 8—8 of Figure 1.

Figure 9 is a vertical section taken on line 9—9 of Figure 8.

Figure 10 is a vertical section, and Figure 11 a plan and partial horizontal section, of the cutter spindle and the means for rotating it and guiding its reciprocating motion.

Figure 12 is an elevation, partly broken away, of the same parts as seen from the right of Figure 10.

Figure 13 is a partial plan and partial section on line 13—13 of Figure 12.

Figure 14 is a view of the same parts as seen from the right of Figure 12, the gear for rotating the spindle being shown in section and the spindle guides in elevation.

Figure 15 is a cross section on line 15—15 of Figure 14.

Figure 16 is a perspective, and Figure 17 a development view of the depth feed cam.

Like reference characters designate the same parts wherever they occur in all the figures.

The rigid supporting parts or frame of the machine comprise a base or pedestal 16 and a column or head 17 having an overhanging arm 18. As in my prior patents and applications the cutter, shown at 20, is similar to a spur gear, preferably one of the involute system of gearing at its cutting edges, and tapered back from such edges, to provide cutting clearance. This cutter is secured to the lower end of the cutter spindle 21 and the latter is adapted to reciprocate and rotate in a cutter-holding carriage or head 22.

This carriage or holder is provided with trunnions 23, 23 by means of which it is hung in the overhanging arm 18 so that it can oscillate, thereby permitting the cutter to be backed off from the work in the non-cutting strokes.

The mechanism for reciprocating the cutter spindle 21, whereby the cutting operation is performed, consists of a main shaft 24, a crank pin 25 carried by said shaft, a connecting rod 26, a lever having an arm 27 and a gear segment 28, and a cylindrical rack 29 surrounding the cutter spindle and keyed, or otherwise made fast, thereto so as to rotate therewith. The crank-pin 25 is mounted adjustably in a radial slot 30 formed in the outer face of a disk 31 which is secured to shaft 24, whereby the length of the crank arm and, therefore, the length of the cutting stroke, may be varied.

The position of the path of the cutter may also be varied. In other words, the limits of this path may be raised or lowered, and for this purpose a fulcrum pin 32, on which the segment lever 27, 28 oscillates, is mounted in the forked lower end 33ª of a post 33 which is vertically movable endwise in a guideway formed in a part of the cutter holder, so that it participates in all of the movements of said holder. A screw 34, threaded into a tapped hole in the post 33 and mounted rotatably in the cover piece 35 of the cutter holding head, but restrained from endwise movement by shoulders 36 and 37 (Figure 4), serves to adjust the fulcrum 32 vertically, in a path parallel to the cutting travel of the cutter. This adjusting screw has an external accessible head or knob 38.

Adjustments of the post 33 are secured by a locking bar 39 which is threaded into a channel perpendicular to and intersecting the guideway of the post 33. The locking bar is cut away at the inner end and is there adapted to crowd against and bind the post 33.

The gear segment 28 and cylindrical rack 29 constitute a gear couple of which the members are made accurately conjugate to one another and the segment member is made concave in axial planes conformably to the circular curvature of the rack 29, in order to distribute the wearing effect and diminish the rapidity of wear. The cylindrical rack is a cylindrical piece having alternate ribs and grooves surrounding the cutter spindle 21 in planes perpendicular to its axis, the profile of which in any axial plane is that of a rack conjugate to the gear segment. Thus the segment makes continuous and correct mesh with the rack in all positions of the cutter spindle, permitting the latter to be freely and continuously rotated.

Preferably the segment is made of substantial thickness, as shown in Figure 6, and the lever of which it is a part is formed with a sleeve-like hub 40 having an extended bearing on the fulcrum pin 32. There are two arms 27 on this lever between which the upper end of the connecting rod 25 is confined.

For guiding the spindle in its reciprocations, I have provided cooperating guides one of which, 41, is secured directly to the spindle by screws 42 or equivalent attaching means, and the other of which is attached to the gear 43 by which the spindle is rotated. Preferably the guide complemental to the guide member 41 is made of two parts, 44 and 45, which are adjustable to take up wear between themselves and the guide member 41, as shown in detail in Figures 10 to 15.

The guide members 44 and 45 are secured by screws or equivalent fastening means 46 and 47, respectively, to the sleeve or hub part 43ª of gear 43. The adjacent edges of these guide members abut against one another on a helical surface 48 (Figure 12) and the member 44 is adjustable lengthwise of the shaft. For thus adjusting it I have provided a screw 49 which is threaded into the member 45 and has a flange 50 entering a groove in the adjacent helical surface of the member 44. Enlarged holes 51 are provided for the screws 46 in the sleeve 43ª to permit of such adjustment. Owing to the helical contact surface 48, the part 44, when adjusted downward, for instance, is moved angularly at the same time, so that its guiding surface is brought up to the contiguous surface of the spindle guide 41 and any looseness which may have existed between these complemental guides is thus taken up. A screw 52, which is threaded into a tapped hole in the guide member 44 and passes through a slot 53 in the member 45, has a fillister head 54 which bears against an abutment surface on the part 45 and clamps these parts together. I have also shown pins 55, 55 and 56 as additional means for securing the guide 41 to the spindle and the guide 45 to the gear.

These guides furnish a completely enveloping bearing for the spindle, for the member 41, secured to the spindle, bears over approximately half of a circumference in the gear hub 43ª, and the members 44 and 45. secured to the gear, bear over the remainder of the circumference on the spindle; these in addition to the edge bearings of the guide members on one another. Herein is a departure from the spindle guiding means of my prior patents, none of which provide any guide bearing corresponding to that of the members 44 and 45 in direct engagement with the spindle; and an advantage, in that the bearing completely surrounding the spindle, thus afforded, has better wearing qualities and provides the maximum of bearing area for a spindle of given diameter and length, without making the outer diameter of the guide members excessively large.

The guide 41 is also one of the end thrusts abutments for the cylindrical rack, for one end of the guide extends to the rack, as shown in Figure 4, and the other end of the rack abuts against a shoulder 57 on the spindle.

Power for rotating the spindle is transmitted from the main shaft 24 to the gear 43 as follows. A worm 58 on the shaft 24 meshes with a worm wheel 59 on a shaft 60, which carries a pinion 61 on its outer end. This pinion meshes with an idle gear 62 carried by an adjustable bracket or quadrant 63 and meshing, in turn, with a gear 64. The latter is associated in a manner which is later described with a gear 65 which meshes with a gear 66 on a shaft 67. Shaft 67 carries a bevel gear 68 in mesh with a complemental bevel gear 69 on a shaft 70. The latter shaft rotates in a vertical position in the machine base and is connected by a universal joint 71 with a transmission shaft 72 having telescopic connection at 73 with a sleeve 74. Said sleeve is connected by a second universal joint 75 with a shaft 76 on which is secured a pinion 77 meshing with the gear 43.

Figure 2:
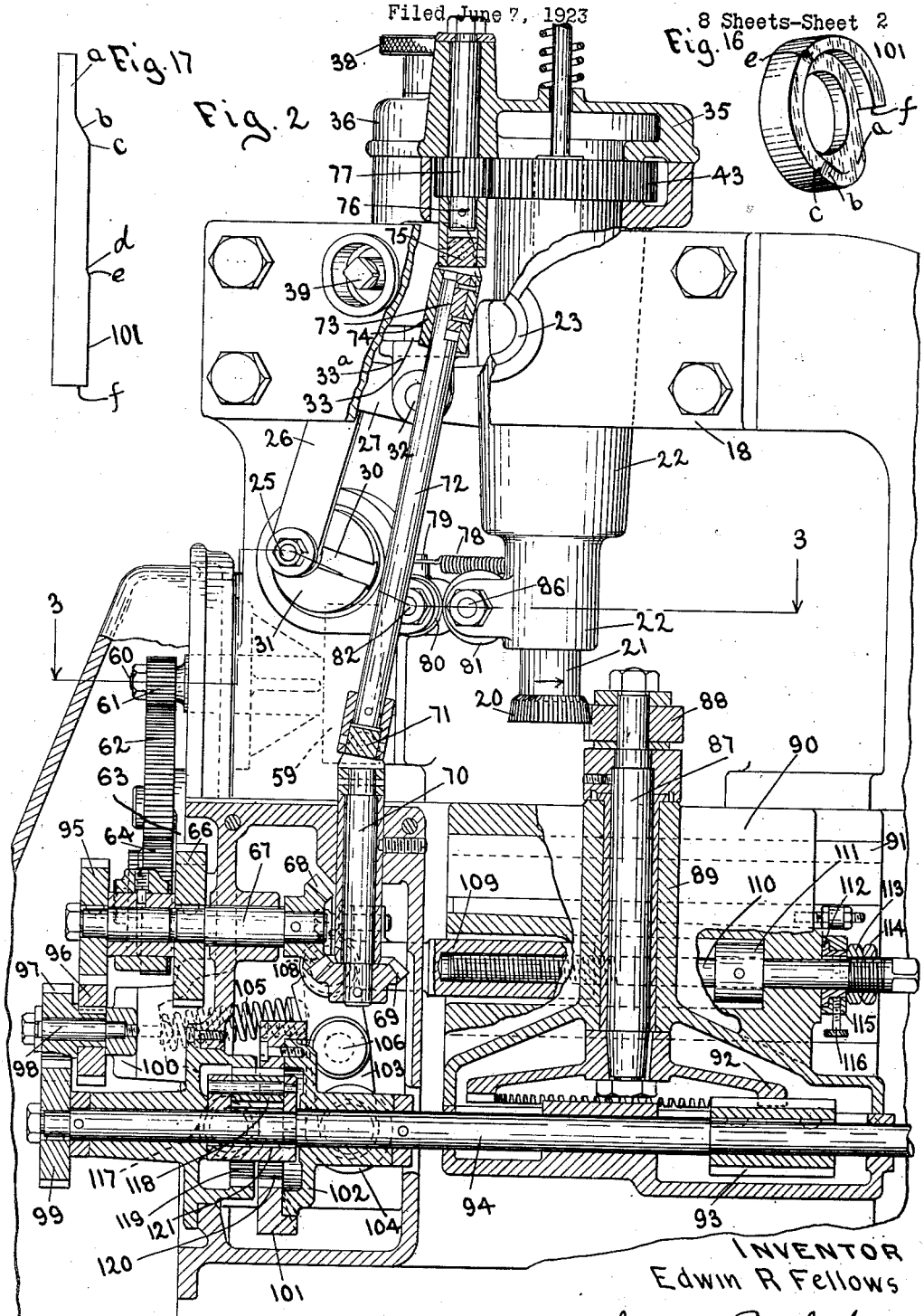
Figure 2 is an enlarged view showing partly in elevation and partly in section on line 2—2 of Figure 1, the principal parts and operating mechanisms of the machine.

The cutter is backed off from the work during its non-cutting strokes by a spring 78 (Figure 4) which is connected to the lower part of the cutter holder and is anchored at a fixed point 79 to the frame. This spring, then, swings the cutter holder about its trunnions 23 from right to left with reference to Figures 2 and 4. This backing off motion is permitted, and after each such motion the cutter is returned into cutting position, by a cam 80 which bears against an abutment 81 on the cutter holder. Said cam is mounted on the end of a shaft 82 (Figure 3) which is driven from the shaft 24 by mating gears 83 and 84. The abutment 81 is a wheel or roll mounted by a ball bearing 85 on a stud shaft 86. On the cam 80 are two high dwells, each occupying substantially one quarter of the circumference, alternating with two low dwells of similar extent, and the ratio of gears 83 and 84 is as one to two; whereby during each cutting stroke, a high dwell holds the cutter up to the work, and on each non-cutting stroke a low dwell permits the spring 78 to withdraw the cutter from the work.

These movements (reciprocation, rotation, and backing off) are the only movements given to the cutter, and the motions needed to bring the cutter and the work into cutting position to effect the required depth feed of the cutter and to withdraw the completed work piece are given to the work. The work spindle is shown at 87. In this machine it is vertical, or more generically, parallel to the cutter spindle, whereby the machine is adapted to produce spur gears. A work piece or gear blank is shown at 88. The spindle is mounted rotatably in a sufficiently long bearing 89 on a carriage 90 mounted to reciprocate on a guide 91 (Figure 7). On the lower end of the spindle is mounted a gear 92 which gives generating rotation to the work and the teeth of which mesh with a pinion 93 on a shaft 94. Said gear 92 is preferably made as a crown gear conjugate to a spur pinion, according to principles explained in my prior Patent No. 1,306,331, granted June 10, 1919, entitled "Machine for cutting crown gears," in order that it may be driven by a pinion on an axis perpendicular to its own axis, and that it may continue to mesh correctly with the pinion when shifted lengthwise of he latter. On its part, the pinion is long enough to maintain mesh with the gear when the carriage is fed toward the cutter to the limit of the depth feed and when it is withdrawn to change the work. The shaft 94 is driven from the shaft 67 by a gear 95 on the latter shaft, a pair of connected gears 96 and 97 on a stud shaft 98, and a gear 99, on the shaft 94, which meshes with gear 97.

The gearing consisting of the crown gear 92 and pinion 93, typifies a simple form of direct gearing, distinguished from the slow speed worm and wheel gearing heretofore used in such machines, whereby a rapid generating motion may be given to the work without driving the impelling shaft of the pinion (typified by the shaft 94) at an excessive speed. The spur gearing 77 and 43 applied to the cutter spindle typifies a similar improvement in that relation. Since the crown gear is essentially a spur gear, these two gear couples represent the simplest means for imparting simultaneous rotation to the cutter and the work spindles, namely, a spur gear drive for the spindles driven from a common source with a minimum of intermediate connections, and this is a phase of the invention which I desire to protect.

As concerns the work spindle, the generic characteristic of the gearing 92 and 93, and of other equivalent gearing (not a worm and wheel) which may be used, distinguishing it from worm and wheel gearing, is that the axis of the pinion is at right angles to the axis of the spindle, or, more broadly, is otherwise than parallel therewith, while at the same time the axis of the pinion crosses the circumference of the gear, whereas in worm gearing the axis of the worm is external to the circumference of the gear.

The rotational driving train for the cutter and work is common from the main shaft 24 to the shaft 67, and there divides into separate trains. The stud shaft 98 is carried by an adjustable bracket or quadrant 100 which permits changeable gears to be used in the train 95, 96, 97, 99; just as the adjustable bracket or quadrant 63 permits changeable gears to be used in the train 61, 62, 64.

The movement of the work carriage 90 permits displacement of the work spindle from the cutter for applying, removing and changing work pieces and also provides the depth feed. These movements are controlled by a cam 101 shown in combination with the other parts of the machine in Figures 2, 8 and 9, and in detail in Figure 16. Said cam is secured to a disk 102, which latter has an extended bearing on shaft 94 and is adapted to rotate thereon. The surface of the cam which controls the carriage is on one side thereof and its motion-producing parts are offset axially more or less. In other words, this is a cam of the cylindrical type. It coacts with a lever 103 having a roll 104 on one arm which is pressed against the cam by a spring 105 acting on the other arm. The lever is pivoted by a stud 106 to a part of the base of the machine, and one of its arms is connected by a wrist-pin 108 with a bar 109. The latter is provided with a tapped passage in which is screwed the threaded end of a rod 110 which passes through the work carriage and carries abutments 111 and 112 which embraces a part of the carriage between them and by which movement in both directions is imparted to the carriage from the lever 103. These abutments are both collars surrounding the rod, and the abutment 111 is pinned to the rod while the abutment 112 is keyed or splined to the rod so that it can be moved to take up looseness and wear, and it is adjusted and secured in this manner by a nut 113 and a lock nut 114 threaded on the rod.

Rotation of the rod in one direction or another, effected by a wrench or crank applied to its exposed square end, may be availed of to adjust the carriage. Such movements are indicated by a graduated collar 115 surrounding the abutment 112 and secured thereto adjustably by a set screw 116.

The thrust applied by the cam 101 to the lever 103 is the force which moves the work up to the cutter and holds it there while cutting takes place. This force is applied by positive mechanism, and in order that the position thus given to the work may be accurate and alike in all similar settings, not liable to variation by springing or distortion of the cam, the latter is backed up by an abutment roll 117 directly opposite to the roll 104 (Figures 8 and 9) supported by a short and rigid pivot stud which is screwed into the base of the machine. The spring 105 merely moves the carriage away when a low part of the cam comes beside the roll 104.

I prefer to carry out the cutting of a gear in one cycle of the machine by making two cuts, a roughing cut all around the work and then a finishing cut; and the cam which I have chosen for illustration herein is designed to carry out that series of steps. Hence starting from the low part of the surface shown at $a$, (Figs. 16 and 17) there is a rise $b$ which first brings the work up to the cutter and then feeds it to the proper depth for the first or roughing cut. Then from the point $c$ to the point $d$ is a dwell which holds the carriage stationary in one place while the roughing cut is being carried on around the entire circumference of the work; at $e$ is a slight rise which moves the carriage further to the extent required for the light finishing cut, and from $e$ another dwell which holds the carriage stationary while the finishing cut is being completed on all the teeth of the blank. Finally at $f$ is an abrupt drop which allows the roll 104 to return to the low surface $a$, and the carriage to be moved back from the cutter.

Rotation is imparted to the cam at a speed slow enough to permit the work to be completely revolved while each of the cam dwells passes the carriage-controlling lever. The mechanism for this purpose consists of a planetary pinion 118 and two internal sun gears 119 and 120, respectively. The planetary pinion is mounted in a holder 121 which is secured to the shaft 94, the sun gear 119 is stationary and is made fast to a part of the base of the machine, and the sun gear 120 is a functional part of the cam 101, being preferably formed by a series of teeth on the inner periphery of such cam, which, for this purpose, is most conveniently made as an annular disk. By providing the gears 119 and 120 with respectively different numbers of teeth, according to well understood principles of differential gearing, the desired speed of rotation may be given to the cam in proportion to the speed of rotation of the shaft.

The cam 101 also serves as a means for stopping the machine when the cycle is completed. It does this by shifting the driving belt 122 from the fast pulley 123 on the main shaft 24 to the pulley 124 which rotates loosely on said shaft. The belt is controlled by a shipper 125 on a lever 126 which swings about a pivot 127 and has an arm 126$^a$ pivoted to a rod 128. Said rod passes into the interior of the base and carries an abutment collar 129 (Figures 8 and 9) between which and the base is confined a spring 130. The spring tends to move the rod 128 from left to right (with respect to its illustration in these drawings) and thereby to shift the belt from the fast to the loose pulley. Such movement is resisted by the cam 101, against the periphery of which the inner end of the rod 126 is pressed by the spring 130. At one point in the periphery of this cam is a recess, one boundary of which, shown dotted at 131 in Figure 9, makes a sudden drop with respect to the rod when it comes into register with the latter. This registry occurs when, or just after, the drop of the carriage-controlling part of the cam has passed the roll 104, whereby the machine is stopped when the work carriage has been withdrawn from the cutter.

Provision is also made for stopping and again starting the machine manually at any time. This provision consists in mounting the pivot 127 of the belt shipper lever eccentrically on a shaft 132 which has a rotatable bearing in the frame and on which is secured, in an accessible position, a lever 133. By reference to Figures 1, 3 and 8, it will be seen that if the shaft 132 is given a half turn from the position in which the drawings show it, the shipper will be moved to the left, about the point of its connection with rod 128 as the fulcrum, far enough to shift the belt from the fast to the loose pulley. Then, while the cam and rod 128 remain in the same position, the machine may be started again by turning the shaft in the opposite direction.

In normal operation, however, the machine is started by rotation of the cam 101, whereupon the rise 134 thereof, adjacent to the drop 131, shifts the rod 128 from right to left and places the driving belt on the fast pulley 123, at the same time compressing the spring 130. Such movement may be given to the cam by manual rotation of shaft 94, by a wrench or the like applied to its squared outer end. This same movement of the cam brings the work carriage into position for cutting to begin; and it is carried out more rapidly than the rotation of the cam by the automatic driving mechanism, because the driving force is then applied directly to the shaft 94 and the slow speed worm and wheel couple 58—59 does not come into action.

Movement of the shaft 94 of the character and by the means just described, independently of the worm and wheel gearing is made possible by the character of association between the gears 64 and 65, previously mentioned. The gear 64 is positively driven by gear 62, but is mounted to revolve loosely on the hub of gear 65. A clutch roller 135 is confined in a recess in the gear 64 between the hub of gear 65 and the inclined or eccentric outer wall 136 (Fig. 1) of such recess. Thus, although power is positively transmitted from the main shaft to this clutch and the shaft 94, the clutch permits independent movement of the entire train from gear 65 to shaft 94 ahead of the gear 64.

The operation of the machine is as follows: Assuming that the work spindle is withdrawn from the cutter spindle and the machine is at rest, the operator places a gear blank on the work spindle and then turns the drive shaft 94 by hand. This movement brings the work spindle toward the cutter and at the same time shifts the driving belt to the fast pulley and start the machine. The gear train for the main shaft 24 then automatically rotates the cutter and work spindles and the depth feed cam by means of the clutch 135 and the further gear trains, as already described. At the same time, the main shaft reciprocates the cutter spindle through the connecting rod 26, lever 27, segment 28 and cylindrical rack 29.

Continuing operation brings the work up to the cutter and feeds it until the cutter teeth have penetrated the work to the proper depth for the roughing cut. At that time the first dwell in the cam 101 comes opposite the roll 104 and continues in contact until the work has made a complete rotation, not from the beginning of the cutting action, but from the point at which the roughing depth feed was completed. Then the cam rise $e$ gives a further increment of depth feed to the carriage, and the second cam dwell passes the roll 104, while the work is making a further complete revolution. At last the drop $f$ at the end of the cam passes the roll 104 and the drop 131 in the periphery of the cam passes the shipper lever rod 128, whereupon the carriage is withdrawn from the cutter and the machine stops.

At the commencement of each downward or cutting stroke of the cutter, its holder or carrier 22 is swung about the trunnions 23 by the cam 80 and the cutter is placed in the cutting path, and is held there during the stroke, while on each return stroke of the cutter the low part of the cam 80 allows the spring 78 to back the cutter away from the work. The axis about which these backward and forward movements take place is parallel to the axis about which the rocker segment moves, to the axis of the main shaft 24, and to the axis of the cam shaft 82. Another expression of the same fact is that the backing off movement of the cutter takes place in a plane which is coincident with or parallel to the plane in which the mechanism for reciprocating the cutter spindle has its movements. Also the oscillating center of the cutter holder is relatively near the rocking center of the segment lever 27, whereby the displacement movement given to the latter center is much less than the backing off movement given to the cutter; and, as the latter movement is very slight, ordinarily not more than one-thirty-second of an inch, the displacement of the segment rocker is imperceptible. Thus the displacement movements of the cutter do not occasion any perceptible variation in the angularity of the connecting rod 26 and it is not necessary therefore, in order to accommodate this slight lateral displacement of the cutter holder. To make the connecting rod any longer than the minimum length which can be used for transforming rotary movement of the crank shaft into reciprocating movement at the cutter spindle. The momentum due to its reciprocation is, therefore, reduced to the minimum, and this is one of the factors which has enabled me to run the present machine at a speed much greater than has ever before been attainable. Another factor leading to the same end is the formation of the rack 29 as a cylindrical rack which rotates with the spindle and is tightly secured thereto. I have been able to make this element much lighter in weight than the corresponding motion-receiving elements used in prior machines.

Figure 3:
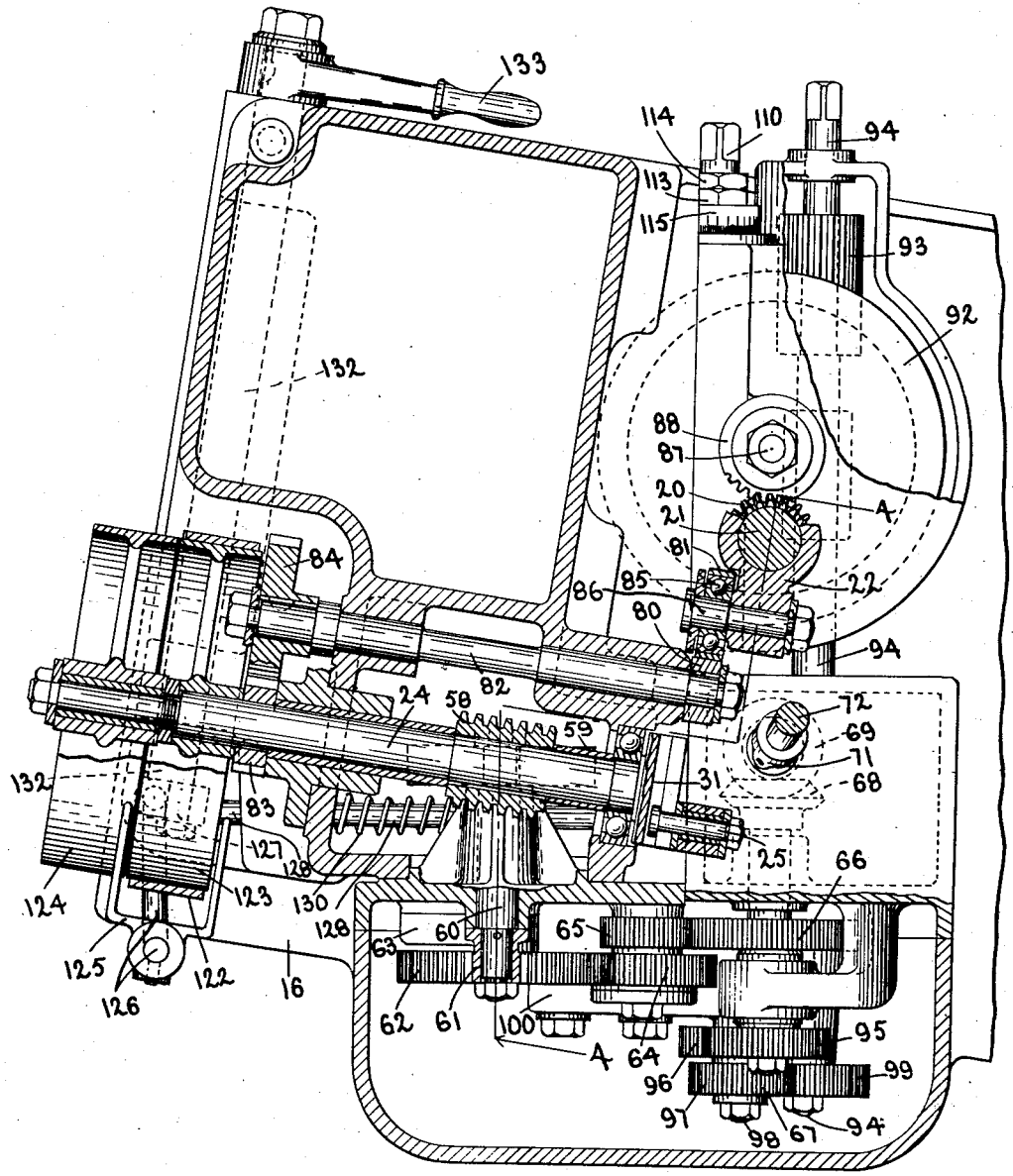
Figure 3 is a plan and horizontal section taken on line 3—3 of Figure 2.

In connection with the backing off movement of the cutter, I call attention to the fact, which is best shown in Figure 3, that the axis about which this movement takes place is oblique to the line in which the movement of the work carriage takes place. The line of centers, or plane of the axes, of the work and cutter spindles coincides with the movement of the work carriage, but the plane in which the backing off movement of the cutter takes place is oblique to the former plane by an amount which is sufficient to avoid interference of the cutter teeth with the notches in the work, when backing off. In the planing action, the teeth at the advancing side of the cutter form grooves in the work which are their exact counterparts, and the sides of such grooves would interfere with the cutter teeth if the cutter were backed off in the common plane of the spindle axes. On the receding side of the cutter and work, however, the teeth of the work have been so far generated that backing off movement somewhat to one side of the common plane of the spindles may take place without interference. The obliquity which is here illustrated between the plane of backing off movement and the common axial plane of the spindles is in that direction and has a value which permit backing off without interference between the cutter teeth and the sides of the grooves cut in the work.

Although in the foregoing description I have described the parts of the machine in considerable detail as shown in these drawings, it will be understood that substantial modifications may be made in the construction, arrangement and relation of the various parts. The parts which have not been specifically described are such as can be readily understood by an inspection of the drawings and be made by those skilled in the art without further instruction.

What I claim and desire to secure by Letters Patent is:

1. A gear generating machine comprising a rotatable and endwise movable cutter spindle having a gear-shaped planing cutter on one end and carrying an encircling series of rack teeth in planes perpendicular to its axis, means for rotating said spindle, an oscillative gear segment conjugate to said rack teeth in mesh therewith and mounted to oscillate in the same plane with the spindle, and automatic mechanism arranged and operated to oscillate said segment at high speed.

2. In a gear shaping machine, a cutter having the outline at its cutting end of a spur gear, a rotatable and endwise reciprocatable spindle carrying said cutter, means for rotating said spindle, a cylindrical rack surrounding said spindle in rigid association therewith and comprising a succession of ribs and grooves in planes perpendicular to the axis of the spindle, which ribs and grooves in their intersection with planes radial to the spindle have the profile of a rack, a gear element conjugate to said rack and in mesh therewith mounted to oscillate about an axis transverse to the spindle, and mechanism constructed, arranged, and operating to oscillate said gear element at high speed.

3. In a gear shaping machine, a cutter having the outline at its cutting end of a spur gear, a rotatable and endwise reciprocatable spindle carrying said cutter, means for rotating said spindle, the spindle carrying on its exterior a succession of ribs and grooves in planes perpendicular to the axis of the spindle, which ribs and grooves in their intersection with planes radial to the spindle have the profile of a rack, a gear element conjugate to said rack and in mesh therewith mounted to oscillate in a plane radial to the spindle about an axis perpendicular to such plane, a driving shaft having a crank, and a connecting rod between said crank and said gear element.

4. In a gear shaping machine, an endwise movable spindle, a rocker geared to said spindle for reciprocating it, a fulcrum on which said rocker is pivoted, and a connecting rod joined to said rocker, a crank to which said connecting rod is connected, and means for shifting said fulcrum in a path substantially parallel to the path in which said spindle has its endwise movement.

5. In a gear generating machine, an endwise movable cutter spindle, a rod mounted beside and parallel to said spindle and being also movable endwise, a rocker lever pivoted to said rod, driving means for rocking said lever, a gear segment carried by the lever, a complemental rack mounted on the spindle and in mesh with said segment, and means for moving said rod endwise to adjust the lever and thereby vary the limits of reciprocating movements of the spindle.

6. In a gear shaping machine, an endwise movable spindle, a holder or head in which said spindle is mounted and in which it has its reciprocating movement, which holder is pivotally mounted to oscillate about an axis transverse to its reciprocatory movement, a cutter on the end of said spindle, and means for reciprocating said spindle consisting of a crank rotatably mounted on a fixed part of the machine, a lever pivotally mounted on said head or holder, a connecting rod between said crank and lever, and a gearing connection between the lever and spindle, the pivot of the lever being in close proximity to the oscillative center of the holder.

7. A gear generating machine comprising a cutter holder and a work holder, spindles carried in said holders and terminating adjacent to one another, one of said spindles being adapted to hold a gear blank and the other a gear-like cutter in position to act by planing movement on the gear blank, one of said holders being movable to cause approach and recession between the cutter and gear blank, the other holder being oscillatively mounted in a manner permitting the end which is nearest to the other holder to swing toward and away from the spindle therein, a fulcrum pivot mounted in the oscillatable holder close to the axis of oscillation thereof, a gear segment mounted on said pivot, a rack element carried by the adjacent spindle in mesh with said segment, and driving mechanism connected to oscillate said segment.

8. In a gear generating machine, a cutter holding head, a cutter spindle rotatably and axially movable in said head projecting at one end therefrom, a gear-shaped planing cutter on the projecting part of said spindle, the head being pivotally mounted to oscillate about an axis transverse to and near the spindle, whereby the cutter may be moved toward and away from the work piece on which it acts, a work-holding carriage, a work spindle rotatably mounted in said carriage parallel to the cutter spindle, and means for moving the work carriage in the common axial plane of said spindles for feeding the cutter to a prescribed depth in the work, the plane in which said cutter head has its oscillative movements being oblique to the line in which said feeding movement takes place.

9. In a gear generating machine, the combination of cutter and work spindles substantially parallel to one another, means for effecting a progressive feeding movement between said spindles in their common plane, and a holder for one of the spindles mounted to oscillate about an axis oblique to said common plane, whereby the end of the spindle carried by said holder which is adjacent to the end of the other spindle is caused to withdraw from and approach said othed spindle in an arcuate path in a plane oblique to the line of feeding movement.

10. In a gear generating machine, a work-holding carriage which is movable for feeding and withdrawing the work, a work-holding spindle mounted in said carriage, a cutter spindle substantially parallel to the work spindle, a holder or head in which said cutter spindle is both rotatable and movable endwise, and trunnions for said holder on which the holder is mounted to oscillate and of which the axis is oblique to the common plane of the spindles.

11. In a gear generating machine, a work-holding carriage which is movable for feeding and withdrawing the work, a work-holding spindle mounted in said carriage, a cutter spindle substantially parallel to the work spindle, a holder or head in which said cutter spindle is both rotatable and movable endwise, trunnions for said holder on which the holder is mounted to oscillate and of which the axis is oblique to the common plane of the spindles, a pivot pin mounted near and substantially parallel to said axis of oscillation, a lever mounted to turn on said fulcrum pin and having a gear segment, a complemental gear element on the spindle in mesh with said segment, and mechanism for oscillating said lever, whereby the spindle is moved back and forth.

12. In a gear generating machine, a work-holding carriage which is movable for feeding and withdrawing the work, a work holding spindle mounted in said carriage, a cutter spindle substantially parallel to the work spindle, a holder or head in which said cutter spindle is both rotatable and movable endwise, trunnions for said holder on which the holder is mounted to oscillate and of which the axis is oblique to the common plane of the spindles, and means for oscillating said holder which comprise a cam, an abutment roll rotatably mounted on the holder, and a spring acting on said holder to press said abutment roll against said cam.

13. In a gear generating machine, a cutter carriage, a cutter spindle mounted in said carriage to be rotatable and movable endwise in a position transverse to and near the axis on which said carriage oscillates and protruding at one end from the carriage, a gear-shaped cutter mounted on the protruding end of the spindle, a cam for swinging the carriage mounted on a fixed part of the frame near that end of the carriage from which the spindle protrudes, an abutment on the carriage complemental to the cam, and a spring arranged to exert force on the carriage holding its abutment against the cam.

14. In a gear generating machine, an oscillatively mounted carriage, an endwise movable spindle in said carriage transverse to and near the axis of oscillation thereof, a cam for swinging the carriage about its axis of oscillation, an abutment on the carriage comprising a roll mounted to turn on a ball bearing, and a spring acting on said carriage to hold the abutment against the cam.

15. A gear generating machine comprising a cutter carriage, a work carriage, cutter and work spindles mounted parallel to one another in the respective carriages, the cutter carriage being arranged to move in a path which carries the work spindle toward and away from the cutter spindle, and means for rotating the work spindle consisting of a shaft extending in the same direction as the path in which the work carriage moves, a pinion on said shaft, and a crown gear on the work spindle in mesh with said pinion, the pinion being so placed and having such length that said gear remains in mesh with it in all positions of the carriage.

16. In a gear generating machine, a cutter carriage, a work carriage, cutter and work spindles mounted, respectively, in said carriage parallel to one another, a guide on which said work carriage is constrained to move in a path transverse to said spindles, a crown gear on the work spindle for rotating the same, a driving pinion in mesh with said crown gear and arranged with its axis parallel to the path in which the work carriage moves, being so placed and having such length that it remains in mesh with the crown gear in all normal positions of the carriage, and means for rotating said pinion.

17. In a gear shaping machine the combination with a work-holding carriage and a cutter, of a shaft geared to the work spindle for rotating the latter, and means for moving the carriage comprising a cam rotatable independently of said shaft, differential gearing driven by said shaft and acting on said cam, and a connection between said cam and the carriage.

18. In a gear generating machine, the combination with cutter and work holders having, respectively, spindles for the cutter and work piece and one of said holders being movable to effect a relative approach and recession between the work and cutter, of a shaft passing through the holder which is so movable and geared to the spindle which is mounted therein so as to rotate said spindle, a cam engaged with said holder for so moving the same, said cam being mounted rotatably upon the shaft, a planetary pinion carried revolubly by said shaft, and differential sun gears in mesh with said planetary pinion, one of said sun gears being stationary and the other being associated and movable with said cam.

19. A gear generating machine comprising a cutter carriage, a cutter spindle rotatably mounted in said carriage and having a gear shaping cutter, a work carriage, a work spindle mounted in said carriage substantially parallel to said cutter spindle, the work carriage being movable in a path which includes the common plane of said spindles, and means for moving said work carriage to feed the work carried thereby toward the cutter spindle comprising a cam, a lever engaged with said cam and movable thereby, and a bar adjustable in length coupled with said carriage and lever for transmitting the movement of the cam to the carriage.

20. In a gear generating machine, the combination of cutter and work holders, spindles for the cutter and work piece mounted in the respective holders, one of said holders being movable to effect a relative movement of approach and recession between the work and the cutter, a shaft arranged in the line of travel of the holder which is so movable, gearing between said shaft and the spindle mounted in the latter holder through which rotation of said shaft imparts rotation to said spindle, a bar adjustable in length connected to the last named holder and arranged in parallel with said shaft, and a cam rotatably mounted on said shaft and driven therefrom at a different speed, and means operatively connected with said bar for giving movement to the last named holder.

21. A gear generating machine comprising a cutter holder, a cutter spindle mounted therein, a work holding spindle, a carriage in which said work holding spindle is rotatably mounted, arranged and guided for movement to bring said work spindle toward and away from the cutter spindle, a spindle driving shaft extending in the direction of movement of said carriage, sliding gearing between said shaft and work spindle constructed to drive said spindle from the shaft in all positions of the carriage, a cam driven from said shaft, and means for transmitting traveling motion from said cam to said carriage.

22. A gear generating machine comprising a cutter holder, a cutter spindle mounted rotatably in said holder, a work carriage, a work holding spindle rotatably mounted in said carriage, said carriage being movable to feed the work spindle up to the cutter spindle, a stopping and starting mechanism for the entire machine, a driven cam, transmitting connections for imparting feed movement from said cam to said carriage, and means controlled by the same cam for actuating said stopping and starting mechanism.

23. In a gear generating machine, the combination of work-holding and cutter-holding spindles, carriages in which said spindles are rotatably mounted, one of said carriages being movable transversely to the axis of the cutter spindle, a power shaft, a gear driven by said shaft, a second gear, a one-way clutch between said gears through which the first gear is adapted to drive the second named gear in one direction, said clutch permitting movement of the second gear in the same direction ahead of the first gear, and mechanism operated by the second-named gear for rotating said spindles and for shifting that carriage which is movable transversely to the cutter spindle, the clutch permitting manual operation of said mechanism for adjustment of said carriage independently of the driving shaft.

24. In a gear generating machine, cutter and work spindles, carriages in which the respective spindles are rotatably mounted, one of said carriages being movable in directions transverse to the cutter spindle, a power shaft, gearing driven by said shaft, a gear driven by said gearing through a clutch which is positive in one direction and permits relative movement of the gear in the opposite direction, relatively to said gearing, gear trains running from said gear to the respective spindles and constructed to rotate them, and a feed mechanism driven by one of the last-named gear trains and constructed and arranged to give movement to the movable carriage.

25. In a gear generating machine a rotatable and endwise movable cutter carrying spindle and means for driving and for guiding the reciprocating movements of said spindle comprising a gear element surrounding the spindle and complemental guide members interposed between the interior of said gear element and the exterior of the spindle, and surrounding the latter, a portion of said guide members being secured to the spindle and having sliding engagement with the gear element, and another portion of said guide members being secured to the gear element and having sliding engagement with the spindle, said guide members being in sliding engagement with one another.

26. In a gear generating machine, a rotatable and endwise movable cutter carrying spindle, means for rotating and guiding the reciprocating movement of said spindle comprising a rotatable gear element surrounding the spindle concentrically therewith, a guide member partially embracing the spindle and secured thereto within the gear element and having sliding engagement in the latter, and a complemental guide member further embracing said spindle and having sliding engagement therein, within the gear element, and being secured to the latter, said guide members having contacting surfaces in sliding engagement with each other.

27. In a gear generating machine, a rotatable and endwise movable cutter carrying spindle, and means for guiding the reciprocating movement of the spindle comprising a cylindrically formed guide secured to and partially embracing the spindle, and a complemental guide member further surrounding the spindle and supported independently thereof, having sliding engagement both with the spindle and with the first named guide.

28. In a gear generating machine, a rotatable and endwise movable cutter carrying spindle, means for guiding the reciprocating movement of said spindle comprising a cylindrical guide, secured to and partly embracing the spindle, and two complemental guide members complementally surrounding the spindle and supported independently thereof, the latter guide members being in contact with one another and with that guide member which is secured to the spindle and one of them being adjustable relatively to the other lengthwise of the spindle, the said two complemental guide members abutting against one another on a surface which is oblique to the axis of the spindle.

29. A gear generating machine as set forth in claim 28 and means for adjusting said adjustable guide member which comprises a screw threaded into one of the members and having a shoulder, and abutments on the other of said members complemental to the shoulder and through which endwise movement is imparted as the result of rotation of said screw.

30. In a gear generating machine, a cutter spindle holder, a cutter spindle rotatable and axially movable in said holder, a gear for rotating the spindle through which the same extends, a cylindrical segmental guide member fixed to the spindle, a plurality of complemental guide members mounted in the gear, said members together surrounding the spindle and having contacting guiding surfaces, and those guide members which are mounted in the gear having a helical contacting surface and one of them being movable axially with respect to the other, whereby to effect an angular displacement of one of the members about the spindle.

31. In a gear generating machine, a cutter spindle holder, a cutter spindle rotatable and axially movable in said holder, a gear for rotating the spindle through which the same extends, a cylindrical segmental guide member fixed to the spindle, a plurality of complemental guide members mounted in the gear, said members together surrounding the spindle and having contacting guiding surfaces, and those guide members which are mounted in the gear having a helical contacting surface and one of them being movable axially with respect to the other, adjusting means engaged with said members and operable to effect such axial adjustment, and clamping means arranged to secure said members in their adjusted position.

32. In a gear generating machine, a cutter spindle holder, a cutter spindle rotatable and axially movable in said holder, a gear for rotating the spindle through which the same extends, a cylindrical segmental guide member fixed to the spindle, a plurality of complemental guide members mounted in the gear, said members together surrounding the spindle and having contacting guiding surfaces, and those guide members which are mounted in the gear having a helical contacting surface and one of them being movable axially with respect to the other, and clamping means extending between said members for securing them in their adjusted position.

33. In a gear generating machine, a rotatable and endwise movable cutter carrying spindle, and means for guiding the reciprocating movements of the spindle comprising a segmental cylindrical guide member secured thereto and two complemental guide members supported independently of the spindle and forming collectively with the first guide member a complete cylindrical structure, said complemental guide members having sliding contact on longitudinal faces with the first-named guide member and having contact between themselves on inclined abutting surfaces, one of the complemental members being adjustable longitudinally relative to the other.

34. A spindle guiding means as set forth in claim 33 in which the contiguous surfaces of the complemental guide members are helical with respect to the axis of said cylindrical structure.

35. A spindle guiding means as set forth in claim 33 combined with means for securing the adjustable one of the complemental guide members in its positions of adjustment.

36. A spindle guiding means as set forth in claim 33 combined with mechanism for so adjusting the adjustable one of said complemental guide members.

37. A spindle guiding means as set forth in claim 33 combined with clamping means for securing the adjustments of said adjustable guide member, said clamping means being arranged to crowd the contiguous surfaces of the members together.

38. In a gear generating machine, a cutter spindle holder, a cutter spindle rotatable and axially movable in said holder, a cylindrical segmental guide member fixed to the spindle, a plurality of complemental guide members mounted independently of the spindle but with capacity for rotating simultaneously therewith, having substantially helical surfaces whereon they abut against each other and having plane surfaces parallel with their common axis whereon they abut against the first-named guide member, and one of said complemental members being adjustable upwardly along the spindle.

39. In a gear generating machine, a spindle rotating member, a cutter spindle arranged to rotate with and reciprocate in said member, a cylindrical segmental guide secured to the spindle, complemental cylindrical segmental guides secured to the spindle rotating member in contact with one another on helical surfaces and with the first-named guide on plane surfaces parallel to the axis of the spindle, one of said complemental members being adjustable longitudinally of the spindle, and means for clamping it to the spindle rotating member in its various adjustments.

40. In a gear generating machine, a spindle rotating member, a cutter spindle arranged to rotate with and reciprocate in said member, a cylindrical segmental guide secured to the spindle, complemental cylindrical segmental guides secured to the spindle rotating member in contact with one another on helical surfaces and with the first-named guide on plane surfaces parallel to the axis of the spindle, one of said complemental members being adjustable longitudinally of the spindle, and means for clamping it to the other complemental guide member on the helical contact surface.

41. A gear generating machine comprising a cutter carriage, a work carriage, cutter and work spindles mounted in the respective carriages, one of said spindles being adapted to move reciprocatively for cutting and both having simultaneous generating motions of rotation, and spur gearing driven from a common source of power arranged for rotating each of said spindles.

42. A gear generating machine comprising a cutter carriage, a work carriage, cutter and work spindles mounted in the respective carriages, one of said spindles being adapted to move reciprocatively and both being rotatable, and spur gearing for driving each of the spindles consisting of a large gear secured to the spindle and a pinion in mesh with each such gear, and a common source of power connected to rotate both said pinions.

43. In a gear generating machine, a carriage holding a rotatable work or cutter spindle and being movable for effecting depth feed between the cutter and the work, and means for driving the spindle rotatably consisting of a large gear thereon, a pinion in mesh with said gear arranged with its axis transverse to that of the spindle and crossing the circumference of the gear, and a shaft by which said pinion is rotated.

44. In a gear generating machine, a carriage mounted with provisions for movement bodily, a spindle rotatably mounted in the carriage and extending in a direction transverse to the path of movement of the carriage, a crown gear on the spindle, a shaft extending in the direction of movement of the carriage and fixed as to its position with respect to such movement, a pinion on said shaft in mesh with the crown gear and of a length sufficient to maintain engagement with the gear in all positions of the latter, a cam for moving the carriage mounted rotatably on the shaft, and means for moving said cam at a relatively slow speed comprising a planet pinion carried revolubly by the shaft, and differential sun gears, one of which is associated with the cam and the other is stationary.

In testimony whereof I have affixed my signature.

EDWIN R. FELLOWS.